March 2, 1965  T. C. WRIGHT ETAL  3,171,875
COLD MOLDED RESISTOR AND METHOD OF FABRICATING SAME
Filed March 12, 1962

INVENTORS
Thomas C. Wright
BY and Donald D. Herendeen

Lockwood, Woodard, Smith & Weikart
Attorneys

United States Patent Office 3,171,875
Patented Mar. 2, 1965

3,171,875
COLD MOLDED RESISTOR AND METHOD OF
FABRICATING SAME
Thomas C. Wright and Donald D. Herendeen, Huntington, Ind., assignors to Model Engineering & Manufacturing Corp., Huntington, Ind., a corporation of Indiana
Filed Mar. 12, 1962, Ser. No. 179,168
6 Claims. (Cl. 264—272)

This invention relates to a method of forming cold molded, encased resistors and more particularly to cold molded, hydraulic cement encased resistors of the power wire-wound fiberglass and asbestos core types.

The technique of encasing power wire-wound fiberglass core resistors, to the present, has been confined almost exclusively to encapsulating the resistance elements in a ceramic case with various fill materials such as hydraulic cements, sodium silicate cements, inorganic filled silicone resins, inorganic filled epoxy resins and vitreous enamel frits. The ceramic case has become recognized as an essential part of these resistors since it affords a convenient means of providing a rigid insulation shell around the resistor assembly until the encapsulating material can be cured to a rigid mass. After curing of the encapsulating material, the ceramic case is a superfluous component of these resistors and economy dictates that it should be omitted if possible. The method of the present invention eliminates the necessity for a ceramic case in fabricating resistors.

A satisfactory insulating material for encasement of power wire-wound fiberglass core resistors must meet several requirements. The material must be rigid and self supporting. It must possess adequate hardness to tolerate handling and assembly operations. It must provide electrical insulation and still maintain excellent heat conduction properties. It must provide protection for the resistance winding from adverse environmental conditions such as high humidity and salt spray. It must be capable of withstanding extreme overloads without burning or becoming conductive. It must withstand thermal shock without cracking and crazing and it must not deteriorate at high temperatures.

The present state of the prior art discloses two materials which meet most of these requirements. Both are presently being used as encapsulating materials in a ceramic shell. These materials are the hydraulic cements and the vitreous enamels. None of the presently used materials will meet all the above requirements. The sodium silicate cements are corrosive under humid conditions. The inorganic filled silicones and epoxies are poor heat conductors and are combustible when the resistors become overloaded. The vitreous enamels crack and craze during thermal shock and the Portland type hydraulic cements deteriorate at the higher temperatures.

It is an object of this invention to provide a method of manufacturing wire-wound fiberglass core resistors without use of a ceramic case.

A more specific object of this invention is to provide a cold molded resistor case using hydraulic cement.

It is still a further object of this invention to provide a cold molded hydraulic cement case which possesses all the necessary requirements such as rigidity, hardness, insulation resistance, heat resistance, heat conductivity, moisture resistance, thermal shock resistance and overload protection normally required of these resistors.

The objects of the invention are accomplished by blending a mixture of hydraulic cement, inorganic aggregate, retarding agents, bonding or gelling agents and water to form a moist molding powder. The powder is placed into a mold which contains the resistance element and is pressed between ½ and 10 tons per square inch pressure to compact the powder. The pressed resistor is then removed and processed through a cure cycle which removes the retarding agents and hydrolyzes the cement.

The full nature of the invention will be understood from the accompanying drawings and the following description and the claims.

Figure 1:
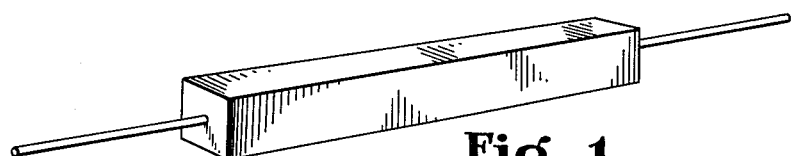
FIG. 1 is a perspective view showing a resistor fabricated in accord with the method of the invention.

As previously noted hydraulic cement has been used in the prior art for encapsulating ceramic cased power wire wound fiberglass core resistors in a ceramic shell and the use of this material per se, is not new. However, to our knowledge, the hydraulic cements previously used have been confined to the Portland (calcium silicate) type cements and other types of hydraulic cements, such as the calcium aluminates, barium silicates and strontium silicates, have not been used.

Calcium aluminate, being a refractory type cement, offers a decided advantage over calcium silicate (Portland) cement in that it withstands extreme temperatures without loss of bond strength. Calcium silicate cement on the other hand disintegrates at high temperatures through the loss of its water of hydration. An additional improvement is gained by the use of calcium aluminate cements in that they offer better heat conductivity than calcium silicate cements due to their higher alumina content.

The molding powder from which the resistor enclosure is formed comprises, fundamentally, a mixture of coarse, inorganic aggregate and hydraulic cement. The coarse aggregate is preferably silica dioxide in the form of sand. Other inert minerals such as the aluminas, zircons, etc. may be used in whole or in mixtures to provide the course aggregate. It is advantageous, though not essential, to include an inert fibrous material to provide additional strength. The fibrous material is preferably calcium metasilicate ($CaSiO_3$) in fibrous form referred to in the trade by the tradename Wollastonite. Other fibrous, inorganic aggregate material, such as asbestos, glass fibre or the like could be substituted for the Wollastonite fibre.

Preferably, a fine aggregate such as ground silica may also be utilized with the coarse aggregate although the presence of such "fines" is not essential.

As an aid in the molding process it is desirable to delay somewhat the initial set resulting from the chemical reaction of the cement. If the initial set is not inhibited or delayed, the gel formed at an intermediate stage in the process of the present invention is set up in the cement and the mixture is difficult to handle. It has been found that retarding agents for delaying initial set can be utilized to advantage. Two such retarding agents which cooperate particularly well with calcium aluminate cement when such is used in the mixture are glucose or a similar sugar derivative, and glycerin.

In the mixing of the ingredients identified above water is added and it is desirable, although not essential, to inhibit evaporation of the water from the mix to prevent the gel from losing water and drying out. This can be accomplished by substituting preferably ethylene glycol (although any other related glycol could be used) for a portion or all of the water added to the dry mixture.

It is also advantageous, though not essential, to employ an ingredient which will serve as a bonding or gelling agent and functions to hold the resistor enclosure material together in shape after pressing or molding and prior to curing. Any cellulose material in the form of water soluble gels (an example is any of the natural gums, such as Arcadia gum) can be used as a bonding agent, however, use of methyl cellulose is preferable and a commercial form of such material is marketed under the trademark "Methocel 60HG" by Dow-Corning Corp., 592 Saginaw Road, Midland, Michigan.

In carrying out the method the dry powders, referred to above are initially weighed out and dry blended in the proporation range set out below:

*Calcium aluminate cement.*—20–50% of total dry mix weight.

*Sand (coarse aggregate).*—30–60% of total dry mix weight.

*Wollastonite fibre (inorganic fibre).*—0–15% of total dry mix weight.

*Ground silica (fines).*—0–20% of total dry mix weight.

To the dry mix may also be added coloring material as desired, and also, if desired, a small amount (up to 10% of the total dry mix weight) of fly ash for the purpose of bonding with the lime released by the chemical reaction of the cement.

The next step in the method is the making up of a gel by mixing the Methocel 60HG (bonding agent) and the water evaporation retardant (ethylene glycol). A slurry is thereby formed and to the slurry is then added water and the retarding agent (sugar or glycerine or both) to form a gel. The ingredients are added to the powders in the proportion range set out below:

*Bonding agent (Methocel 60HG).*—Approximately one and one-half grams per one hundred grams of dry mix weight.

*Water evaporation retardant (ethylene glycol).*—Approximately one to twenty cc. per 100 grams of dry mix weight.

*Water.*—Approximately one to twenty cc. per 100 grams of dry mix weight.

*Sugar.*—Approximately 1 gram per 100 grams of dry mix weight.

*Glycerin.*—Approximately 2 cc. per 100 grams of dry mix weight.

The gel formed by these ingredients is added to the dry mix and is then mulled or blended into a wet mix. The wet mix is then dried out if required and subsequently granulated and screened to the desired consistency for molding.

Figure 2:
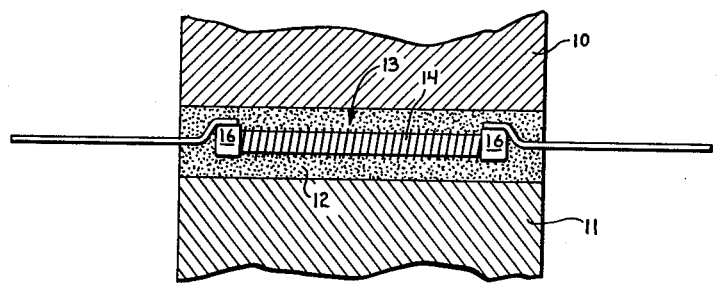
FIG. 2 is a fragmentary, cross-sectional view of a resistor in the pressing or compacting stage of the method.
Figure 3:
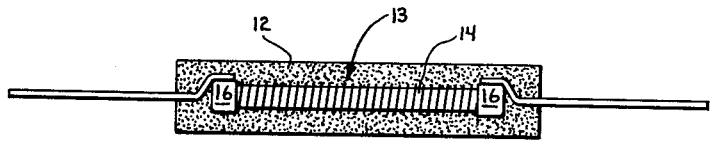
FIG. 3 is a sectional view showing a modified form of the resistor.

Reference is now made to FIGS. 1–3 of the drawings which illustrate the molding or pressing of the dried and granulated mix. In FIG. 2 reference numeral 10 indicates schematically an upper ram portion of a press and 11 the lower ram. The granulated mix 12 is pressed in the mold cavity around a resistance element 13 which consists of a wire wound fibreglass core 14 to which terminal lead assemblies 16 have been attached. The upper and lower rams simultaneously apply equal pressure to the granulated mix in the cavity. The magnitude or unit pressure on the mix may fall within a range of one-half to ten tons per square inch. The resulting resistor, after completion of a curing cycle now to be described is shown in FIGS. 1 and 2.

Since the cement in the molded resistor must be subjected to a curing cycle and since the ethylene glycol, if used in the mix, must be evaporated out of the molded resistor, the curing operations described below are required.

If ethylene glycol is used in the mix as a drying retardant, this may be driven out of the molded resistor by placing the resistor in an oven at medium heat (125–150° C.) for approximately two hours. The temperature range and heating time can be inversely varied to produce the required evaporation of the ethylene glycol.

To provide a curing cycle for the cement, the molded resistor is then placed in an autoclave or in a high humidity chamber (at 90–98% relative humidity), preferably at elevated temperature, for a time period of at least one hour. It will be understood that the temperature and time period may be inversely varied to produce the desired curing effect. It has been found to be desirable, subsequent to the subjection of the resistor to the high humidity atmosphere, to immerse the resistor in boiling water for approximately two hours although this operation is not absolutely necessary to the production of a satisfactory resistor.

Figure 4:
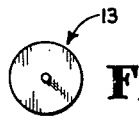
FIG. 4 is an end view of the resistor shown in FIG. 3.

FIGS. 3 and 4 illustrate a resistor identical to that of FIGS. 1–2 except that it is cylindrical in configuration.

Figure 5:
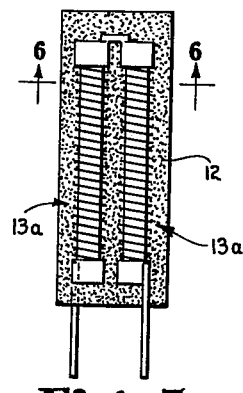
FIG. 5 is a sectional view of a further modified form of the resistor.
Figure 6:
FIG. 6 is a transverse sectional view of the resistor shown in FIG. 5, the section being taken generally along the line 6—6 of FIG. 5.

FIGS. 5 and 6 illustrate a modified form of the resistor having dual, interconnected elements 13a with the lead wires extending from one end of the resistor.

Figure 7:
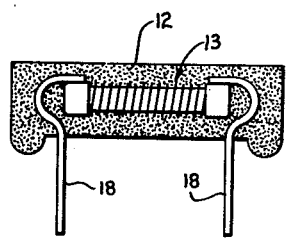
FIG. 7 is a sectional view of a further modified form of the resistor.
Figure 8:
FIG. 8 is an end view of the resistor shown in FIG. 7.

FIGS. 7 and 8 illustrate a further modified form of the resistor wherein the lead wire 18, extending from the wire-wound element 13b, protrude from the side of the resistor rather than its ends as in FIGS. 3 and 5. It will be understood that the resistors of FIGS. 1–2, FIGS. 3–4, FIGS. 5–6 and FIGS. 7–8 are all fabricated by the method herein described.

While the invention has been disclosed and described in some detail in the drawings and foregoing description, they are to be considered as illustrative and not restrictive in character, as other modifications may readily suggest themselves to persons skilled in this art and within the broad scope of the invention, reference being had to the appended claims.

The invention claimed is:

1. A method of manufacturing power resistors of the type wherein a resistance element is encased in a protective material comprising: first forming a dry mix by blending calcium aluminate cement 20–50% of the total dry mix weight, coarse aggregate 30–60% of the total dry mix weight, inorganic fibre 1–15% of the total dry mix weight, and fines 1–20% of the total dry mix weight; second, making a gel by blending approximately one to twenty cc. of ethylene glycol per one hundred grams of said dry mix, approximately one to twenty cc. of water per one hundred grams of said dry mix, approximately two cc. of glycerine per one hundred grams of said dry mix, approximately 1 gram of granulated sugar per 100 grams of said dry mix, and approximately one gram of methyl cellulose per one hundred grams of said dry mix; third, mulling the gel thus formed into the dry mix, drying the mulled mix as required and subsequently granulating the damp mix into a powder; fourth, compressing the granulated damp powder about the resistance element under a pressure ranging from one-half to ten tons per square inch; fifth, subjecting the molded resistor to a temperature of approximately 125–150° C. for approximately two hours; sixth, subjecting the resistor to a relative humidity ranging between 90–98% and a temperature of approximately 20 to 100° C. for a time period of at least one hour; and, finally immersing the resistor in water at a temperature of 20° C. or higher for a period of time sufficient to achieve the desired hardness.

2. A method of manufacturing power resistors of the type wherein a resistance element is encased in a protective material comprising: first forming a dry mix by blending hydraulic cement 20–50% of the total dry mix weight, coarse aggregate 30–60% of the total dry mix by weight, inorganic fibre 1–15% of the total dry mix by weight and fine aggregate 1–20% of the total dry mix weight; second, making a gel by blending approximately one to twenty cc. of glycol per one hundred grams of said dry mix, approximately one to twenty cc. of water per one hundred grams of said dry mix, and approximately one and one-half grams of cellulose gum per one hundred grams of said dry mix; third, mulling the gel thus formed into the dry mix and subsequently granulating the damp mix into a powder; fourth, compressing the granulated damp powder about the resistance element under a pressure ranging from one-half to ten tons per square inch; fifth, subjecting the molded resistor to a temperature of approximately 125–150° C. for approximately two hours; sixth, subjecting the resistor to a relative humidity ranging between 90–98% and a temperature of approximately 20 to 100° C. for a time period of at least one hour.

3. A method of manufacturing power resistors of the type wherein a resistance element is encased in a protective material comprising: first forming a dry mix by blending hydraulic cement 20–50% of the total dry mix weight, coarse aggregate 30–60% of the total dry mix weight and fine aggregate 1–20% of the total dry mix weight; second, making a gel by blending approximately one to twenty cc. of glycol per one hundred grams of said dry mix, approximately one to twenty cc. of water per one hundred grams of said dry mix, and approximately one and one-half grams of cellulose gum per one hundred grams of said dry mix; third, mulling the gel thus formed into the dry mix, and subsequently granulating the damp mix into a powder; fourth, compressing the granulated damp powder about the resistance element under a pressure of ranging from one-half to ten tons per square inch; fifth, subjecting the molded resistor to a temperature of approximately 125–150° C. for approximately two hours; sixth, subjecting the resistor to a relative humidity ranging between 90–98% and a temperature of approximately 20–100° C. for a period of time of at least one hour.

4. A method of manufacturing power resistors of the type wherein a resistance element is encased in a protective material comprising: first forming a dry mix by blending hydraulic cement 20–50% of the total dry mix weight, coarse aggregate 30–60% of the total dry mix weight and fine aggregate 1–20% of the total dry mix weight; second, making a wet mix by adding to the said dry mix approximately one to twenty cc. of water per one hundred grams of said dry mix, and approximately one to twenty cc. of glycol per one hundred grams of said dry mix; third, blending the wet and dry ingredients together and subsequently granulating the damp mix into a powder; fourth, compressing the granulated damp powder about the resistance element under a pressure ranging from one-half to ten tons per square inch; and, finally, subjecting the molded resistor to a temperature of approximately 125–150° C. for approximately two hours; sixth, subjecting the resistor to a relative humidity ranging between 90–98% and a temperature of approximately 20 to 100° C. for a time period of at least one hour.

5. A method of manufacturing power resistors of the type wherein a resistance element is encased in a protective material comprising: first forming a dry mix by blending hydraulic cement 20–50% of the total dry mix weight, coarse aggregate 30–60% of the total dry mix weight, and fine aggregate 1–20% of the total dry mix weight; second, making a wet mix by adding to the said dry mix approximately eight to twenty cc. of water per one hundred grams of said dry mix; third, blending the water and dry mix together and subsequently granulating the damp mix into a powder; fourth, compressing the granulated damp powder about the resistance element under a pressure ranging from one-half to ten tons per square inch; and, finally, subjecting the resistor to a relative humidity ranging between 90–98% and a temperature of approximately 20–100° C. for a time period of at least one hour.

6. A method of manufacturing power resistors of the type wherein a resistance element is encased in a protective material comprising: first forming a dry mix by blending hydraulic cement 20–50% of the total dry mix weight, inert aggregate 50–80% of the total dry mix weight; second, making a wet mix by adding to the said dry mix approximately eight to twenty cc. of water per one hundred grams of said dry mix; third, blending the water and dry mix together and subsequently granulating the damp mix into a powder; fourth, compressing the granulating damp powder about the resistance element under a pressure of ranging from one-half to ten tons per square inch; and, finally, subjecting the molded resistor to a curing cycle of relatively high humidity.

References Cited in the file of this patent
UNITED STATES PATENTS

| | | |
|---|---|---|
| 1,099,071 | McCoy | June 2, 1914 |
| 1,933,128 | Wiegand | Oct. 31, 1933 |
| 2,930,018 | Hinkle | Mar. 22, 1960 |
| 2,977,561 | Pugh et al. | Mar. 28, 1961 |